May 20, 1947. G. W. CORNELIUS 2,420,932
CONTROL SYSTEM FOR AIRPLANES
Filed Aug. 11, 1943 5 Sheets-Sheet 1
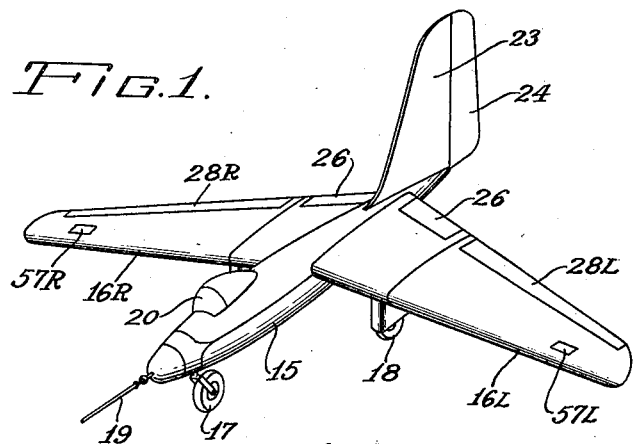
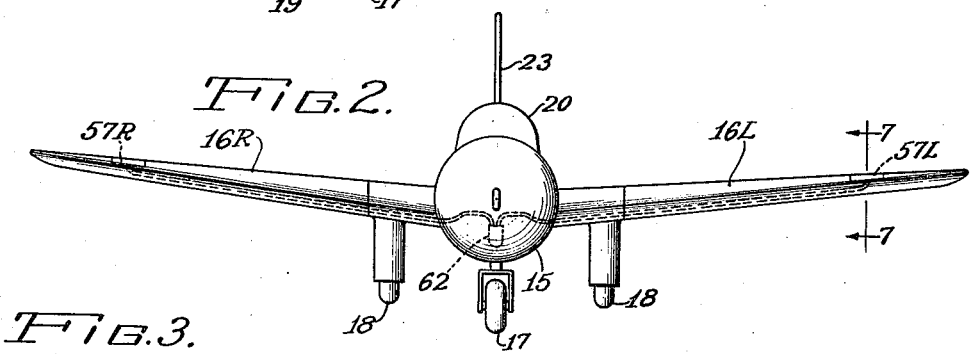
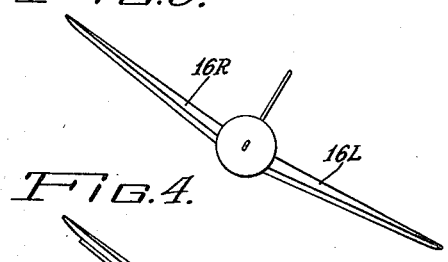
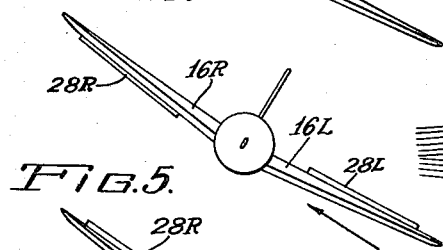
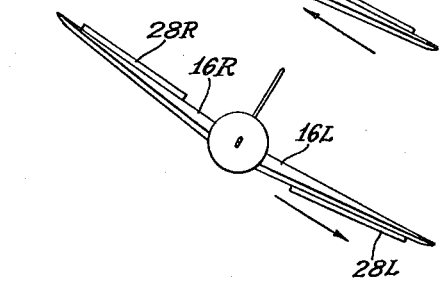
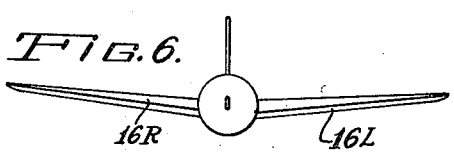
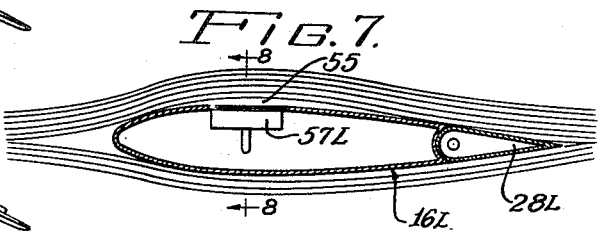
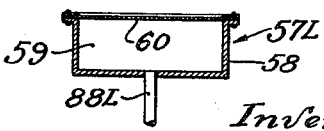
Inventor:
George W. Cornelius
By Wallace and Cannon
Attorneys

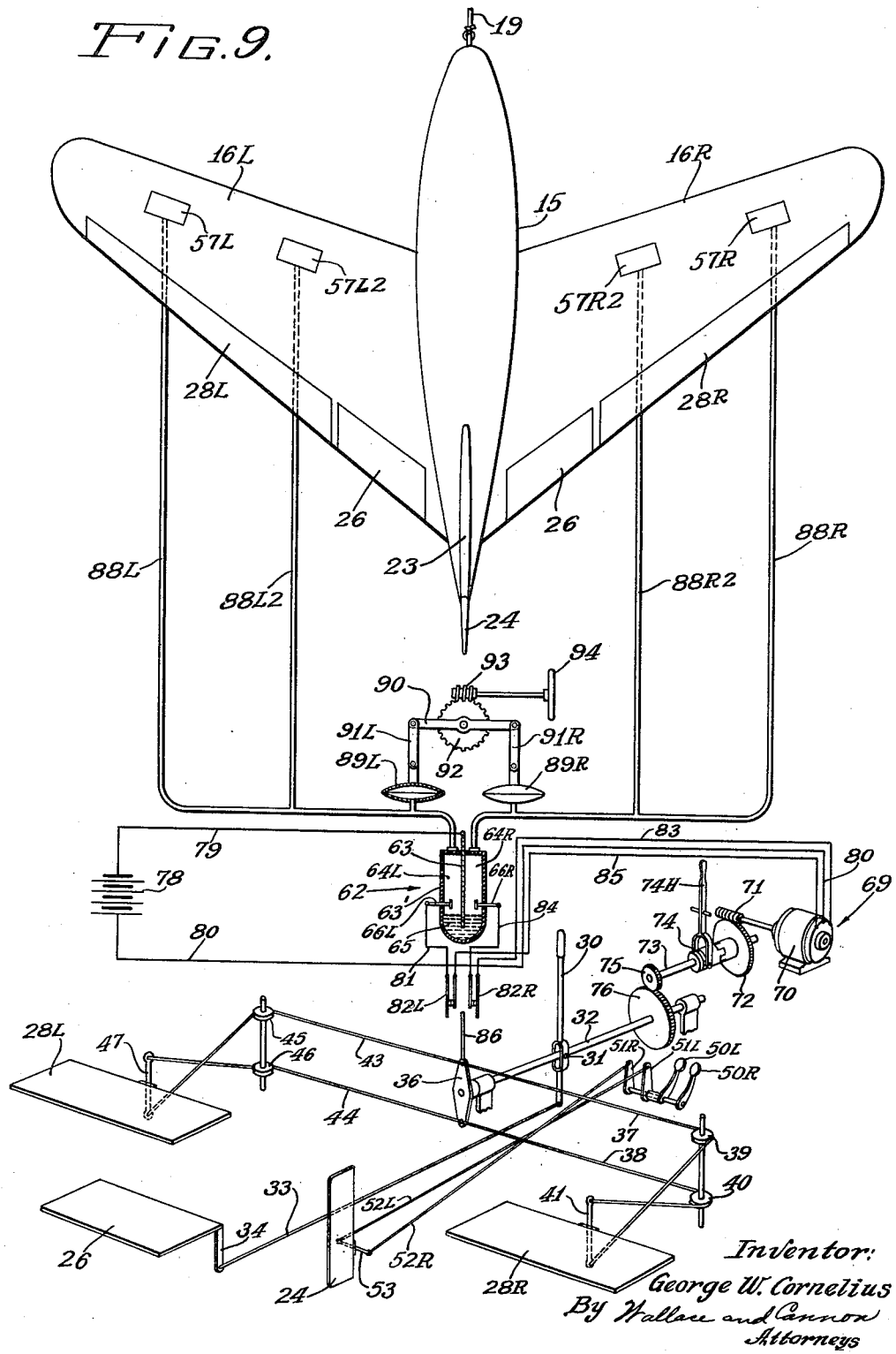

May 20, 1947.　　G. W. CORNELIUS　　2,420,932
CONTROL SYSTEM FOR AIRPLANES
Filed Aug. 11, 1943　　5 Sheets-Sheet 3

Inventor:
George W. Cornelius
By Wallace and Cannon
Attorneys

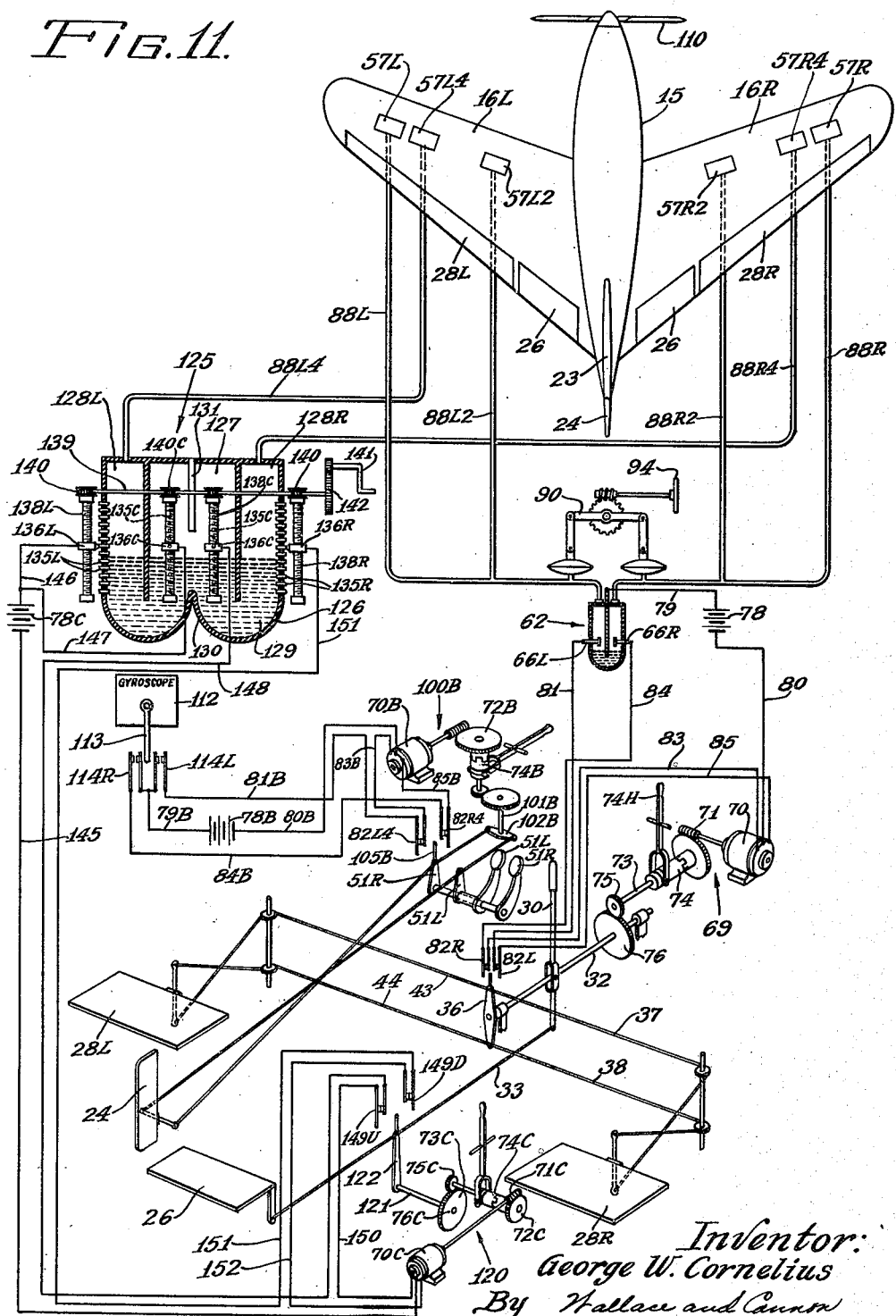

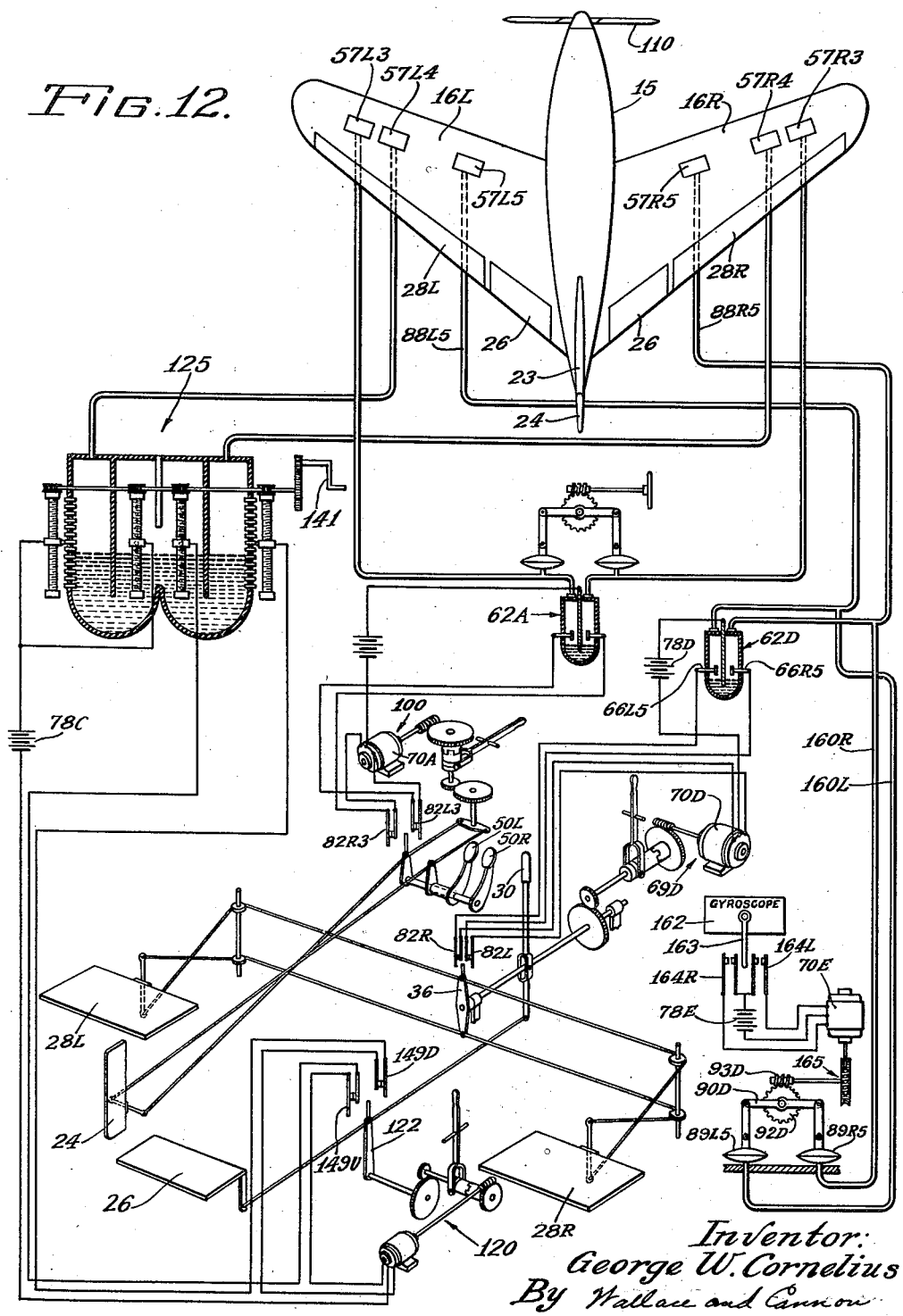

Patented May 20, 1947

2,420,932

UNITED STATES PATENT OFFICE 2,420,932

CONTROL SYSTEM FOR AIRPLANES

George W. Cornelius, Dayton, Ohio, assignor of one-half to E. H. Johnson, Dayton, Ohio Application August 11, 1943, Serial No. 498,203

8 Claims. (Cl. 244—78)

This invention relates to airplanes, and particularly to the control of airplanes in flight.

It is generally recognized that the proper control of a conventionally constructed airplane requires an extremely high degree of training and skill upon the part of the pilot in order to attain properly coordinated actuation of the various control mechanisms which govern the flight path of the airplane, and it is therefore the primary object of this invention to simplify the control of airplanes, and to attain better and more accurate and sensitive control thereof, so as to thereby improve the performance characteristics of such airplanes and reduce deviation thereof from the desired flight path; and an object related to the foregoing is to attain these results by means of a relatively simple and inexpensive character.

Among the factors which have heretofore complicated the control of airplanes is the necessity for accurate coordination between different and independently actuated control mechanisms such as the ailerons and the rudder so as to properly meet the widely varying conditions encountered in flight. For example, in a normal turn, which may be initiated by conventional foot actuation of the rudder, the ailerons must be actuated in such a coordinated manner as to properly bank the airplane and thereby prevent skidding or slipping of the airplane in the turn. It is, therefore, a further object of this invention to enable slipping and skidding of an airplane in a turn to be avoided or reduced to an unobjectionable amount; and objects related to the foregoing are to automatically inter-relate and coordinate the control movements of the ailerons and the rudder to attain this end; to simplify the control of an airplane in turns so that but a single control element may be used which may govern either the ailerons or the rudder, while the other of such aerodynamic control means are automatically coordinated with the aerodynamic means which are directly actuated by such single control element; and to accomplish these results by means of a sensitive yet simple and economical character.

Another undesirable condition which is often encountered in flight is the effect of sudden gusts of wind which strike or react upon one or more of the aerodynamic surfaces of the airplane to disturb the normal magnitude and distribution of the aerodynamic forces which have theretofore acted upon the airplane to sustain the desired flight position and path. Such disturbance of the aerodynamic forces acting on the airplane may vary in many different respects, and may result in displacement of the flight position or attitude of the airplane about the pitching, yawing or rolling axes. One example of such undesired displacement of the airplane occurs when a gust of wind imparts an increased aerodynamic lifting force to one of the wings. Such increased lift serves to raise that wing of the airplane, thus causing displacement of the airplane about its rolling axis. The gust of wind which has thus increased the aerodynamic lifting forces on one of the wings is also effective to increase the drag on this wing so as to cause yawing of the airplane toward the side of the airplane upon which such gust is effective. Such yawing normally constitutes the first perceptible effect of such a gust, and thereafter the raising of the affected wing causes the airplane to swing or turn in the other direction about the yawing axis. Thus the normal effect of such a gust of wind is to swing the airplane off its course first in one direction and then in the other direction.

With prior systems of airplane flight control, it has been impossible to prevent such yawing and swinging of an airplane because the corrective control operations have been instituted by the pilot or by the gyroscopic mechanism only after the deviation from the desired flight course has reached a sufficient magnitude to be perceptible to the pilot or to the gyroscopic or other control means. When the deviation of the airplane from the desired course has reached such a magnitude, the airplane has attained momentum or inertia along the undesired course, and in order to restore the airplane to the desired course, it has been necessary to overcome such inertia, with the result that overcontrol often causes weaving of the airplane back and forth across the desired course as efforts are made to re-establish the flight of the airplane along such desired course.

In view of the foregoing, it is a further object of this invention to enable such objectionable deviation of an airplane from the desired flight path or course to be minimized or avoided; and other objects related to the foregoing are to automatically overcome the usual disturbing effects which result from the unbalanced action of gusts of wind upon an airplane; and to accomplish this in such a way that corrective swinging of the airplane back and forth across the desired course is obviated. A more specific object of the invention is to enable the location, direction and magnitude of the disturbing or unsymmetrical aerodynamic forces to be detected before the usual yawing and swinging movements of the airplane have started, and to apply corrective control measures to the aerodynamic control means of the airplane at this time so as to re-establish the desired balance of the aerodynamic forces acting on the airplane and thereby prevent occurrence of such yawing and swinging of the airplane as would ordinarily result from such a gust.

A further object of the invention is to enable aerodynamically responsive means to govern the flight level of an airplane, and a related object is to accomplish such control by means which may be set or adjusted while the airplane is at one flight level and which will thereupon cause the airplane to change its flight path so as to attain the flight level indicated by the new adjustment of the control means.

A further object of the invention is to enable aerodynamically responsive control means to be utilized to govern the flight path of an airplane, and a related object is to enable this to be accomplished in conjunction with automatic course determining means such as a gyroscope.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a perspective view of a glider of the flying wing type which is provided with control means embodying the present invention;

Fig. 2 is a front elevational view of the glider shown in Fig. 1;

Fig. 3 is a front elevation of the glider in a proper banking attitude;

Fig. 4 is a view similar to Fig. 3 and showing the airplane in a skid;

Fig. 5 is a view similar to Fig. 3 and showing the airplane in a slip;

Fig. 6 is a view similar to Figs. 3 to 5 and showing the airplane in a proper level flight attitude;

Fig. 7 is a schematic cross sectional view of one of the wings of the airplane taken along the line 7—7 of Fig. 2 and illustrating a part of the control apparatus as well as the air flow about the wing and with relation to the control means;

Fig. 8 is an enlarged cross sectional view of one of the elements of the control means, the view being taken along the line 8—8 of Fig. 7;

Fig. 9 is a schematic view illustrating the control apparatus of this invention as it is applied to the airplane or glider of Fig. 1;

Fig. 11 is a schematic view illustrating the invention as it is applied to an airplane to attain gyroscopic control of the airplane; and Fig. 12 is a schematic view illustrating another embodiment of the invention as it is applied to an airplane to attain gyroscopic control of the airplane.

Figure 10:
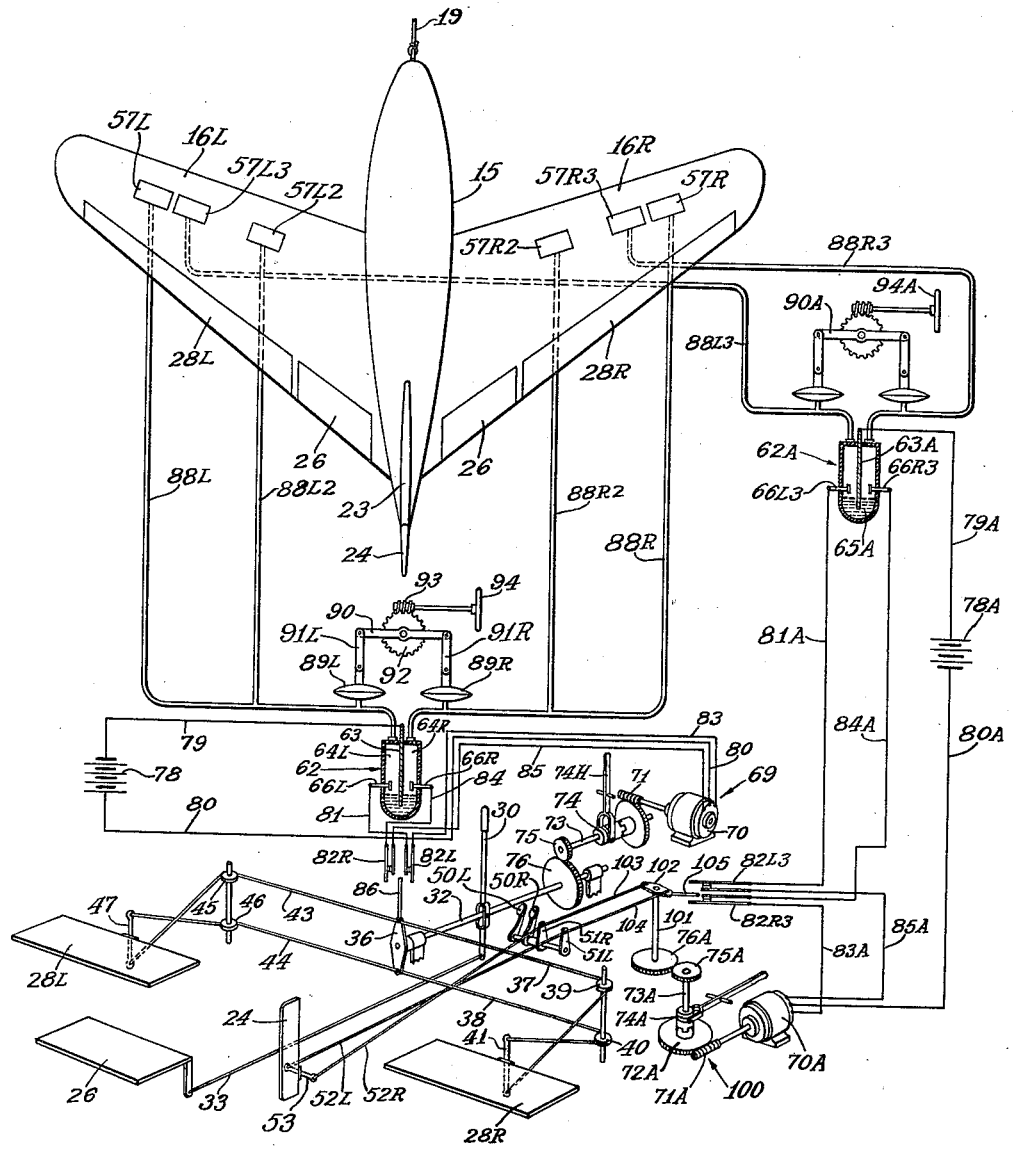
Fig. 10 is a view similar to Fig. 9 and showing another embodiment of the invention.

In the form of the invention illustrated in Figs. 1 to 9 of the drawings, the invention is embodied in an airplane which is of the glider type. This airplane has a fuselage 15 disposed midway between the ends of a wing structure which affords wings 16L and 16R. This airplane is of the tailless monoplane type, and has landing gear which includes a forward wheel 17 disposed beneath the forward end of the fuselage 15 and a pair of spaced rear wheels 18 disposed beneath the wings 16R and 16L. The airplane shown in Fig. 1, being of the glider type, is adapted to be actuated in a forward direction by means including a tow line 19, and the fuselage is provided with an upwardly extending compartment 20 which provides space for a pilot from which the pilot may have an adequate view of the surroundings of the airplane.

It will be understood that the present invention may be applied to many types of airplanes, but as herein shown the airplane to which the invention is applied is of the general character disclosed in my copending application Serial No. 452,479, filed July 27, 1942. As disclosed in the aforesaid copending application, the wing structure of the airplane has a substantial forward sweep, and the wings are so formed that each wing includes an inboard or trailing wing panel and a leading or outboard wing panel. These wings are arranged to have a substantial dihedral angle, as will be evident in Fig. 2 of the present drawings, for by such an arrangement the stability of the airplane is substantially increased. The airplane as herein shown is provided with steering means which are disposed in an upwardly extending relation on the rear portion of the fuselage 15, and this steering means comprises a vertical fin 23 and an associated rudder 24 which may be operated in the conventional manner to cause the airplane to turn either to the right or to the left. The wing structure is also provided with elevator flaps 26 mounted in the inboard wing panels adjacent to and on opposite sides of the center line of the fuselage 15. The wing structures are also provided with trailing edge wing flaps 28R and 28L which extend throughout substantially the entire length of the rear edges of the respective outboard wing panels so that the trailing edge flaps 28R and 28L serve as ailerons.

The present invention is concerned primarily with the control of the various aerodynamic control means of the airplane so that these means may be readily and easily controlled to produce the proper and desired flight attitude, and particularly the present invention is concerned with producing an improvement in the performance characteristics of the airplane so as to reduce deviation of the airplane from the desired flight path. Thus it may be observed that when an airplane is to be turned to the right or to the left from the course upon which it has been flying, the attainment of such a turn, while preserving a proper and efficient flight attitude, involves the coordinated actuation of the rudder 24 as well as the ailerons 28. In the past this coordinated actuation has been attained through actuation of means such as the control stick of the airplane and has required considerable skill upon the part of the pilot in order to produce the desired turning action without skidding of the airplane in an outward direction with relation to the turn, or without slipping of the airplane in an inward direction with respect to the turn. It will be also recognized that in the past it has been possible to govern the control means of an airplane by gyroscopic means which maintain the airplane on a desired flight course, but such means have been relatively complicated and expensive.

In the embodiment shown in Figs. 1 to 9 of the drawings, the invention is utilized to automatically coordinate the ailerons 28 with the adjustment of the rudder 24 so as to attain the proper attitude of the airplane in turns thereof, and the arrangement is also such that the ailerons are automatically controlled so that the airplane will not be thrown off of its course when gusts of wind produce unsymmetrical lifting forces on the wings of the plane. In this embodiment of the invention, the various aerodynamic control means are governed in substantially the usual manner so that the pilot may actuate any of these aerodynamic means if he desires so to do. In addition to the usual means for adjusting or controlling the various aerodynamic control means, the present invention also affords automatic means for coordinating certain of the aerodynamic means, and as a basis for the description of such automatic means, the usual control means will now be described. Such usual control means includes the usual control stick 30 which is supported for movement in a direction from front to rear of the airplane by a pivot 31, and this pivot is mounted on a rock shaft 32 which extends in a direction from front to rear of the airplane. The front to rear movement of the control stick 30 about its axis 31 is utilized to control the elevators 26, as shown in Fig. 9 of the drawings, and this is accomplished by a rod 33 which extends from the lower end of the control stick 30 to the lower end of an arm 34 which extends downwardly from one of the elevators 26. It may be recognized that the rod 33 and the arm 34 are duplicated for the other one of the elevators 26. Thus when the control stick 30 is moved forwardly, the elevators 26 are pivoted upwardly, thereby to induce upward movement or climbing of the airplane, while rearward movement of the stick 30 pivots the elevators downwardly so as to induce downward or forward pitching of the airplane.

When the control stick 30 is moved laterally in one direction or other, such movement results in actuation of the ailerons 28. This is accomplished through means including an arm 36 which is fixed on the shaft 32 at its rear end, and cords 37 and 38 are extended from the upper and lower ends respectively of the arm 36 to the right so that these cords pass about pulleys 39 and 40 respectively which are mounted on vertical axes. The upper cord 37 is connected to the lower end of an arm 41 which is fixed to the forward edge of the right hand aileron 28R, and the lower cord 38 is similarly connected to the upper end of the arm 41. Similar cords 43 and 44 are extended from the upper and lower ends respectively of the arm 36 so as to pass around pulleys 45 and 46, and these cords are connected to the lower and upper ends respectively of an arm 47 which is fixed at its midway point to the forward edge of the left hand aileron 28L. Thus by moving the control stick 20 to the right, the right hand aileron 28R is elevated and the left hand aileron 28L is lowered, and this results in lowering of the right hand wing 16R and raising of the left hand wing 16L. Similarly, a movement of the stick 30 to the left causes movement of the ailerons in the other directions and causes the left hand wing to be lowered and the right hand wing to be raised.

In the embodiment of the invention shown in Fig. 9, the rudder 24 is actuated in the usual manner by the foot pedals 50L and 50R, and the elevators 26 are actuated by the usual front to rear movement of the control stick 30, and means constructed in accordance with the present invention are utilized to coordinate the ailerons 28 with the actuation of the rudder 24 and also to overcome the effects which would normally result from unbalanced gusts of wind which may be effective upon the airplane. In the attainment of these results, the present invention provides means for detecting variations in the lift of the two wings 16R and 16L and in response to such detection, the ailerons are adjusted before the detected variations in the lift have had an opportunity to change the course or the attitude of the airplane. Such detection of the variations in the lift of the wings 16L and 16R is attained through measurement of the air pressure which is effective on the wings, and this is preferably accomplished by measuring the air pressure at the low pressure areas along the upper camber of the wings. Thus, as shown in Fig. 7 of the drawings, the air flow about the airfoil section of a wing produces a low pressure in the area 55 along the upper surface of the wing, and pressure responsive detecting means 57L and 57R are disposed in such low pressure areas on the wings 16L and 16R respectively and adjacent to the outer ends of these wings as shown in Figs. 1, 2 and 7.

The detecting devices 57L and 57R as herein shown are quite similar to aneroid barometers, each of the detecting devices having a cup-shaped member 58 which defines a pressure chamber 59, and the upper or outer side of the pressure chamber is closed by flexible diaphragm 60. Hence when variations in external pressure are encountered, the diaphragm 60 is caused to move inwardly or outwardly with respect to the chamber 59, and this produces corresponding variations in the pressure within the chamber 59. Further detecting devices 57L2 and 57R2 may also be provided on the respective wings 16L and 16R, and these devices may be connected by tubes 88L2 and 88R2 to the tubes 88L and 88R, and by this arrangement a mean value of the air pressure on each wing may be obtained. A larger number of pressure sensing devices might of course be employed, and these devices might be varied in construction in order to obtain the desired mean pressure for control purposes. Such variations in pressure are utilized in this embodiment of the invention to determine whether or not the air pressures or the lifting forces upon the two wings are equal or are in the desired ratio. This is attained by comparing the air pressures effective on the two wings, as sensed or detected by the pressure responsive devices 57L and 57R, and upon the basis of such comparison, the ailerons 28L and 28R are actuated in one direction or the other so as to correct the relationship between the lifting forces effective on the two wings. Thus, as shown in Fig. 9 of the drawings, a comparing device 62 is provided within the airplane, and this comparing device is in the present instance in the nature of a manometer which affords a casing 63' made from an insulating material and which is divided by a metallic central plate 63 to afford a left hand chamber 64L and a right hand chamber 64R. The dividing plate 63 terminates in spaced relation to the lower end of the casing 63' so that the two chambers 64L and 64R are connected at their lower ends and, in effect, afford a U-tube. The U-tube or casing 63' is filled with mercury or some other conducting liquid 65 to a predetermined level which is considerably above the lower edge of the dividing plate 63, and electrical contacts are provided whereby predetermined upward displacement of the mercury 65 in one side or other of the comparing device may be ascertained. Thus a contact 66R is afforded in the chamber 64R, and a similar contact 66L is afforded within the chamber 64L, and these contacts are so positioned that they are both normally located in spaced relation to the upper surface of the mercury 65. The comparing device 62 is associated, as will hereinafter be explained, with the detecting devices 57L and 57R so that when a lower pressure is detected on one of the wings, the mercury in the corresponding side of the comparing device 62 will be caused to raise in that side of the comparing device, thereby to close circuit between the corresponding contact and the central or dividing plate 63, and such circuit closure is arranged to cause power means 69 to operate the ailerons to correct the inequality of lift which has been effective upon the two wings of the airplane. The power means as herein shown is arranged to rock the shaft 32 in one direction or the other and the gearing through which this is done is shown in a schematic manner in Fig. 9. Thus an electric motor 70 of the reversible type has a worm 71 on its motor shaft whereby a relatively large worm gear 72 may be driven in either direction, this worm gear being loosely mounted on a shaft 73. The worm gear 72 may be clutched to the shaft 73 by a clutch 74, and the rotative movement of the shaft 73 is imparted to the shaft 32 by a small gear 75 fixed on the shaft 73 and meshed with a relatively large gear 76 fixed on the shaft 32.

To afford the necessary electrical circuits for the motor 70, a battery 78 has one of its terminals connected by a wire 79 to the dividing plate 63, while the other terminal of the battery is connected by a wire 80 to the center or common terminal of the motor 70. When the circuit is closed from the plate 63 to the contact 66L, circuit is extended through a wire 81 to a normally closed limit switch 82L and a wire 85 to the other side of one of the windings of the motor 70, and when circuit is thus established, the motor 70 operates in such a direction that the shaft 32 is rocked in a counterclockwise direction as viewed in Fig. 9. This operates the ailerons so that the left hand aileron 28L is raised and the lift of the left hand wing is decreased, while the aileron 28R lowered, and the lift of the right hand wing 16R is increased. Similarly, a circuit is afforded by a wire 84 from the contact 66R to one contact of a normally closed limit switch 82R, and a wire 83 extends circuit from the other contact of the switch 82R to the other terminal of the other winding of the motor 70. When circuit is closed between the plate 63 and the contact 66R, the motor 70 is operated to rock the shaft 32 in a clockwise direction, thereby to lower the left hand aileron and increase the lift of the left hand wing 16L and raise the right hand aileron 28R and decrease the lift of the right hand wing 16R. The limit switches 82R and 82L are arranged to break the proper actuating circuit when the ailerons reach the limit of their travel in one direction or the other, and this is accomplished by an upward extension 86 provided on the arm 36 and extended between the downwardly extended outer arms of the switches 82R and 82L.

In associating the pressure responsive detecting devices 57L and 57R with the comparing device 62, the detecting device 57L has a tube 88L connected to the chamber 59 thereof, as shown in Fig. 8, and this tube is connected at its other end to the upper end of the chamber 64L of the comparing device 62. Similarly, a tube 88R is connected between the detecting device 57R and the upper end of the chamber 64R of the comparing device 62. Thus, the comparing device 62 is rendered jointly responsive to the air pressures which are effective on the two wings 16R and 16L, and if desired the air pressure on each wing may be measured at a plurality of points so that the mean pressure on each wing is applied to the corresponding side of the comparing device. Thus, as shown in Fig. 9, a second detecting device 57L2 is mounted in the upper surface of the wing 16L between device 57L and the fuselage 15, and a detecting device 57R2 is similarly positioned on the wing 16R. The detecting devices 57L2 and 57R2 are connected by tubes 88L2 and 88R2 to the tubes 88L and 88R so that the mean pressures effective on the respective wings are transmitted to the corresponding sides of the comparing device 62.

It will be understood that under normal conditions when the airplane is at rest, the pressures in the two chambers 64L and 64R should be equal, and to facilitate the attainment of this relationship, two pressure devices 89L and 89R are associated with the tubes 88L and 88R respectively. Each such pressure device is in the form of a pair of flexible concave diaphragms joined at their edges so that the two diaphragms may be pressed together or separated in their central portions to thereby effect variations in air pressure in the connected portions of the system. When the pressure in the two chambers 64L and 64R is to be adjusted, one of the pressure devices is compressed and the other is expanded, and to enable this to be readily accomplished, a centrally pivoted adjusting bar 90 is mounted so that its opposite ends extend over the two pressure devices as shown in Fig. 9. The opposite ends of the adjusting bar 90 are connected to the upper ends of the pressure devices 89L and 89R by links 91L and 91R. The adjusting bar 90 has a worm gear 92 fixed thereto, and a worm 93 having an operating handle 94 is associated with the worm wheel 92 so that the adjusting bar 90 may be rocked back and forth to attain the desired adjustment of the pressures in the chambers 64L and 64R.

Assuming that normal pressures in chambers 64L and 64R are equal, the operation of the mechanism when a gust of wind is encountered will now be described. Assuming that the airplane is proceeding in a normal level flight attitude, as shown in Fig. 6 of the drawings, it will be further assumed that a gust of wind becomes effective upon the right wing 16R so as to increase the lift of this wing and tend to tip the airplane toward the left. Ordinarily this would result, first in an increased drag on the right wing 16R which would turn the plane slightly toward the right, and as the increased lifting forces became effective upon the right hand wing, this wing would be substantially elevated so as to cause the airplane to turn toward the left. With the control mechanism of the present invention, however, the increased air velocity along the wing 16R is immediately effective to produce a reduced pressure upon the detecting devices 57R and 57R2. This causes the diaphragm 60 of this pressure device to move outwardly so as to thereby produce a lower pressure in the chamber 64R of the comparing device. This, in turn, causes the mercury 65 to rise in the chamber 64R so as to close circuit through the switch 82R and to one winding of the motor 70. This causes the motor to operate in such a direction that the right hand aileron 28R is raised and the left hand aileron 28L is lowered. Such corrective actuation of the ailerons reduces the effective lifting action of the right hand wing 16R and increases the lift of the left hand wing 16L, and hence the increased air velocity which is effective upon the right hand wing does not have an opportunity to lift the right hand wing 16R from the position which it has previously occupied with relation to the other or left hand wing. Hence it will be clear that the control means of this invention as illustrated in Fig. 9 is effective to prevent undesired deviation of the airplane from the desired course when unsymmetrical gusts of wind are encountered.

Under certain flight conditions it is desirable to apply other corrective adjustments to the ailerons 28L and 28R, such situations being found in the execution of turns to the right or to the left. Thus, as illustrated in Fig. 4 of the drawings, a turn to the left may be executed at such a speed that even though the airplane is banked to a certain extent, the airplane may skid in an outward direction as indicated by the arrow in Fig. 4, and such a situation requires that the outer or right hand aileron 28R be further lowered while the inner or left hand aileron 28L be further elevated. The present invention, as illustrated in Fig. 9, also functions to attain automatic application of the desired correction to the ailerons under such circumstances, for it will be seen that such a skid of the airplane in an outward direction on a turn is caused by insufficient lift upon the outer wing. Thus, in the situation hereinabove discussed with respect to Fig. 4 of the drawings, the insufficiency of the lift on the outer or right wing 16R would be evidenced by a higher pressure on the detecting device 57R than the pressure on the device 57L, and this pressure differential would be so applied that it would cause the mercury 65 to rise in the chamber 64L to thereby close circuit between the plate 63 and the contact 66L. This closes the motor circuit so as to rock the shaft 32 in a counterclockwise direction, thereby to raise the aileron 28L and lower the aileron 28R, and this corrective actuation of the ailerons proceeds until the skidding tendency of the airplane has been overcome and the pressures on the detecting devices 57L and 57R have been thereby equalized. The same action would, of course, take place in the opposite direction in the event that an airplane were to tend to skid outwardly in the course of a right hand turn.

The operation of the control mechanism of Figs. 1 to 9 is also such that it effects the proper corrective movement of the ailerons in the event that the airplane tends to slip inwardly in the course of a turn in either a right hand or left hand direction. Such a circumstance is illustrated in Fig. 5 of the drawings where the airplane in the course of a left hand turn has been banked to such an extent that it tends to slip inwardly of the turn as indicated by an arrow in this figure of the drawings. Under the circumstances thus assumed, the inward slipping tendency of the airplane is due to an insufficient lift of the inner or left hand wing so that the pressure acting on the detecting device 57L would exceed the pressure which would then be acting upon the detecting device 57R. This would therefore increase the pressure in the chamber 64L of the comparing device 62, thereby to cause the mercury to rise in the chamber 64R so as to make the contact with the switch contact 66R. This would establish circuit to the motor 70 such a way as to cause the shaft 32 to be rocked in a clockwise direction. This would act to raise the right hand or outer aileron 28R and to lower the inner or left hand aileron 28L. This would of course tend to reduce the banking attitude or angle of the airplane so as to thereby overcome the slipping tendency, and if necessary the correcting action might continue until the ailerons reached their extreme position shown in Fig. 5, although this is quite improbable because the correcting action of the ailerons would under most circumstances overcome the slipping tendency of the airplane before this extreme relationship of the ailerons was attained.

It will be recognized that with the control mechanism of Fig. 9 the pilot may under some circumstances desire to resume the normal manual control of the airplane, and this may be done by disengaging the clutch 74, and to enable this to be done a handle 74H is associated with the clutch 74.

The normal operation of the automatic control mechanism shown in Fig. 9 is to coordinate the positions of the ailerons with the rudder adjustment, or to automatically compensate for the added lifting action which may in some instances become effective upon one or the other of the wings, but under some circumstances the adjusting handle 94 may be so manipulated that the automatic control mechanism may be used to automatically set or adjust the ailerons in one direction or the other from their normal positions. This may be accomplished by increasing the pressure on one side of the control or comparing device 62. Thus, if the handle 94 were actuated so as to produce a higher pressure in the chamber 64R, this pressure would force the mercury 65 upwardly in the chamber 64L so as to thereby establish contact with the contact member 66L. Hence the motor 70 would be energized so as to rock the shaft 32 in a counterclockwise direction so as to thereby elevate the aileron 28L and lower the aileron 28R. This would reduce the lift of the left hand wing 16L and would increase the lift of the right hand wing 16R and the operation of the motor 70 would continue until the right hand wing had been so elevated as to compensate for the unbalanced condition which has been established in the comparing device 62. The mercury 65 would then drop so as to break the circuit to the motor 70. Thus the adjustment handle 94 may function to operate the ailerons in one direction or the other as desired by the pilot.

It will be recognized that in the primary use of the construction shown in Fig. 9 the automatic control means operate to coordinate the ailerons with the adjustment of the rudder, such adjustment of the rudder being accomplished manually by the pilot. In Fig. 10 of the drawings however another embodiment of the invention is illustrated wherein the ailerons may be manually adjusted and automatic means are provided whereby the rudder is automatically adjusted to conform with the manually attained adjustment of the ailerons. Thus in the embodiment shown in Fig. 10 of the drawings, all of the mechanism shown in Fig. 9 is included, and corresponding elements bear the same reference numerals in Figs. 9 and 10. In this connection it will be recalled that the adjustment handle 94 may be utilized to cause the ailerons to be adjusted in one direction or the other, but for simplicity of description, it will be assumed that the operation of the ailerons is to be governed by the normal control stick 30. In such an instance the pilot would of course operate the handle 74H so as to disengage the clutch 74, and this would place the ailerons entirely under the control of the stick 30. When this is done, the pilot may in effect initiate the desired turning movement to the right or left by movement of the control stick 30 to the right or to the left in accordance with the direction of the desired turn. Assuming that the pilot wishes to turn toward the right, the control stick 30 is moved toward the right so as to impart corresponding clockwise rocking movement to the shaft 32, and this results in raising of the right aileron 28R and lowering of the left aileron 28L. Hence the lift on the right wing 28R is reduced, with a resulting increase in the air pressure on the top of the wing, and the lift on the left wing 28L is increased, with a corresponding or related reduction in air pressure on the top of the left wing, and this relationship of the aerodynamic forces acting on the respective wings is utilized to produce coordinated actuation and positioning of the rudder 24. This is accomplished by aerodynamically responsive control means which includes detecting means 57L3 and 57R3 disposed in the low pressure areas of the tops of the respective wings 16L and 16R, and which are effective through a comparing device 62A to control a power actuating mechanism 100 which operates the rudder 24.

The comparing device 62A is similar to the comparing device 62 and affords a U-tube construction having right and left hand chambers which are connected by tubes 88R3 and 88L3 respectively to the detecting devices 57R3 and 57L3. Similar adjusting mechanism including a rock bar 90A and an adjusting handle 94A are associated with the comparing device 62A to determine and adjust the pressure ratio which will cause the mercury 65A to be disposed in a non-contacting relation to the two contacts 66L3 and 66R3 of the comparing device.

The power driving mechanism 100 includes a reversible motor 70A having a worm 71A on its motor shaft which drives a worm wheel 72A loosely mounted on the shaft 73A. A clutch 74A connects the worm wheel 72A to the shaft 73A, while a small pinion 75A on this shaft drives a large gear 76A mounted on a vertical shaft 101. The shaft 101 has a cross arm 102 fixed on its upper end and the left hand end of this arm is connected by a cord 103 to the lever arm 51R of the usual rudder control mechanism. Similarly, the right hand end of the cross arm 102 is connected by a cord 104 to the lever arm 51L of the rudder control means, so that by rocking movement of the shaft 101, the rudder 24 may be actuated in the desired direction. Normally closed limit switches 82L3 and 82R3 are disposed on opposite sides of an arm 105 which extends from the right hand end of the cross arm 102 so that these switches will be selectively opened when the rudder 24 is actuated to either of its extreme positions, and these switches are included in the respective energizing circuits of the motor 70A. Thus, a battery 78A has its opposite terminals connected by wires 79A and 80A, respectively, to the plate 63A and the center terminal of the motor 70A. A wire 81A extends from the contact 66L3 to one terminal of the switch 82L3, while the other terminal of the switch 82L3 is connected by a wire 85A to the other terminal of one of the windings of the motor 70A, and when this circuit is completed, the shaft 101 is rocked in a counter-clockwise direction as viewed in Fig. 10 so as to turn the rudder 24 to the left. The circuit from the other contact 66R3 is afforded by a wire 84A which extends to one contact of the switch 82R3, and a wire 83A extends from the other contact of the switch 82R3 to the other terminal of the other winding of the motor 70A. When this circuit is completed, the motor 70A operates in such a direction that the shaft 101 is rocked in a clockwise direction and the rudder 24 is turned to the right.

Thus, with the embodiment of the invention shown in Fig. 10, the actuation of the ailerons 28 in one direction or the other by the controlling actuation of either the stick 30 or the control means governed by the handle 94 results in coordinated actuation of the rudder 24 so as to cause the airplane to execute a properly banked turn. As an example of such operation of the embodiment of the invention shown in Fig. 10, it will be assumed that the pilot wishes to turn to the right, and to initiate such turn the stick 30 is moved to the right. This raises the right aileron and lowers the left aileron, with the result that the air pressure sensed at the detecting device 57L3 is lower than that sensed by the detecting device 57R3, and hence the mercury 65A is forced upwardly so as to engage the contact 66L3 and this closes circuit to the motor through the circuit which includes the switch 82R3. The shaft 101 is therefore rocked in a clockwise direction so as to turn the rudder to the right. Such turning of the rudder 24 starts immediately upon the shifting of the ailerons, and proceeds as the airplane rolls toward the right into its banking attitude, and when the banking angle becomes such that the lift on the two wings returns to its normal condition of equality, the mercury level in the comparing device 62A will return to normal, and the motor circuit through the contact 66L3 will be broken. The rudder 24 therefore comes to rest in such a right-rudder position that the desired right turn is executed without slipping or skidding. When, in the course of such a turn, the pilot desires to return to a straight line course, the ailerons are returned to their normal positions, and this will so change the pressures effective on the comparing device 62A that the mercury will be displaced into engagement with the contact 66R3. Hence the other motor circuit will be completed, and the motor will rock the shaft 101 in a counter-clockwise direction so as to return the rudder 24 in a left hand direction toward its neutral position. Such return movement of the rudder will of course proceed as the ailerons are returned gradually to their normal position, and when such aileron adjustment and the resulting return movement of the rudder have brought the airplane to a level flight attitude, the control pressures on the two wings also become equal and the circuit to the motor 70A is broken and the rudder movement stops.

While the embodiments of the invention disclosed in Figs. 1 to 9 and in Fig. 10 have been illustrated as applied to a glider type of airplane, it will be recognized that these embodiments of the invention may be applied with equal facility to airplanes which embody their own source of forward driving motive power. Moreover, it will be evident that the control apparatus thus far described may be utilized in motor driven airplanes in association with further control means whereby the operation of the airplane may be further improved and simplified. Thus, in Fig. 11 of the drawings, I have schematically illustrated still another embodiment of the present invention whereby such improved operation is attained. The airplane shown in Fig. 11 is substantially the same as that shown in Figs. 1 to 9, with the exception, however, that as shown in Fig. 11, the airplane is actuated in a forward direction by a propeller 110 which is driven from the engine (not shown) mounted within the nose of the fuselage 15.

In the embodiment of the invention shown in Fig. 11, the ailerons 28 are controlled by means substantially like that shown in Figs. 1 to 9, and those elements of the control apparatus and of the airplane which are the same as in Figs. 1 to 9 are designated by the same reference numerals. Thus the ailerons 28L and 28R are operated automatically to avoid lateral displacement of the airplane by unsymmetrical gusts, and also are automatically controlled and operated in coordinated relation to the lateral movements of the rudder 24. In this embodiment of the invention, however, the rudder 24 is actuated under control of automatic means which by appropriate actuation of the rudder serve to govern the course of the airplane. As herein shown such automatic means comprises a gyroscope 112 having a settable or adjustable indicating and controlling arm 113 disposed in a horizontal plane. The arm 113 is disposed between a pair of normally open control switches 114R and 114L so that when the airplane deviates from a course determined by the setting of the arm 113, the arm will be engaged with one or the other of the switches in accordance with the sense of such deviation, and will thereby close such switch so as to cause operation of power means 100B to apply a corrective movement to the rudder 24 in the proper sense or direction. The power means 100B is of substantially the same construction as the power means 100 of Fig. 10, and corresponding elements thereof bear corresponding reference characters with the suffix "B" in each instance. The power means 100B also has normally closed limit switches 82L4 and 82R4 associated therewith, and in the present instance these switches are disposed on opposite sides of an arm 105B which is extended from the arm 51R of the rudder actuating connections. To form the energizing circuits for the motor 70B, a wire 79B is connected to one contact of each of the switches 114L and 114R, and this wire is extended to one terminal of a battery 78B. The other terminal of the battery 78B is connected by a wire 80B to the center or common terminal of the motor 70B. The other terminal of the switch 114L is connected by a wire 81B to one terminal of the limit switch 82L4, the other terminal of this limit switch being connected to the other terminal of one of the windings of the motor. When this winding of the motor is energized, the power means 100B is operated in such a direction that the rudder 24 is moved in a left hand direction. The circuit for the other winding of the motor is energized, the power means 100B is operated in such a direction that the rudder 24 is moved in a left hand direction. The circuit for the other winding of the motor 70B includes a wire 84B from the other contact of the switch 114R to one contact of the switch 82R4, and a wire 85B is extended from the other contact of the switch 82R4 to the other terminal of the other winding of the motor 70B. When this winding of the motor is energized, the power means 100B is operated in such a direction that the rudder is moved in a right hand direction.

Thus when the gyroscopic means 112 detects deviation from the desired course, the appropriate one of the switches 114R or 114L is closed, and the rudder 24 is so actuated as to induce turning movement in the proper direction to return the airplane to the desired course. As such turning movement takes place, the ailerons 28L and 28R are automatically adjusted to produce the proper attitude of the airplane in the turn.

Thus the course of the airplane shown in Fig. 11 is governed automatically, and in addition, means are provided whereby the flight elevation of the airplane is automatically controlled by means which are aerodynamic in character. Such control means include a power actuating mechanism 120 for actuating the elevators 26, and as herein shown this mechanism comprises a motor 70C having a worm 71C on its motor shaft. The worm 71C engages and drives a worm gear 72C which is loosely mounted on a shaft 73C and which may be clutched to the shaft 73C by a clutch 74C. The shaft 73C acts through a pinion 75C and a gear 76C to rock a shaft 121. The shaft 121 is connected to one of the elevators actuating rods 33 by an arm 122 so that rocking movement of the shaft 121 serves to impart control movements to the elevators 26.

In accordance with the present invention the actuating mechanism 120 is governed by aerodynamic means which are responsive to the air pressures acting on the wings 16 of the airplane, the pressures effective on the two wings being averaged so as to represent a function of altitude and air speed, and this averaged air pressure is then utilized to control the motor 70C through adjustable means which enables the altitude of flight to be varied as desired. Thus, the wings 16L and 16R are provided with pressure responsive detecting devices 57L4 and 57R4 which are located and constructed as shown in Figs. 7 and 8, and these detecting devices are connected by tubes 88L4 and 88R4, respectively, to opposite sides of a pressure averaging device 125. The pressure averaging device 125 as herein shown is in the form of a mercury switch mechanism having a housing 126 made from insulating material and affording a vertical central chamber 127 and a pair of vertical side chambers 128L and 128R. The side chambers 128L and 128R are arranged to communicate at their lower ends with the central chamber 127 so that a body of mercury 129 may pass freely among the several chambers. Preferably a division wall 130 is extended upwardly in the central chamber to act as a baffle to prevent undue lateral flow of the mercury. The tube 88L4 is connected to the closed upper end of the chamber 128L, while the tube 88R4 is similarly associated with the upper end of the chamber 128R, so that pressure in the two chambers 128L and 128R may force the mercury upwardly in the central chamber 127 in an amount which is representative of the average of the pressures in the outer chambers. Such action is preferably facilitated by a vent 131 in the upper end of the central chamber 127, but it will be recognized that under some circumstances a closed central chamber 127 might be employed. The side chamber 128L has a series of electrically isolated contacts 135L extended through a side wall thereof in a vertical line so that a slide contact 136L disposed outside of the chamber may be selectively engaged with any one of the contacts 135L, thereby to render such contact active. Similarly a series of contacts 135R is provided in a wall of the chamber 128R, and an external slide contact 136R is provided for selective cooperation with any one of the contacts 135R. To enable the contacts 136L and 136R to be adjusted in unison, these contacts are mounted as nuts, on screw shafts 138L and 138R, respectively, and these shafts are actuated in unison from a shaft 139 by worm and worm wheel gearing 140. An adjustable handle 141 is connected by gearing 142 to the shaft 139 for adjusting the contacts 136R up and down in unison.

One of the side walls of the central chamber 127 is provided with two similar rows of electrically isolated contacts 135C which are adapted to be selectively engaged by externally located slide contacts 136C, and the contacts 136C are mounted as nuts on screw shafts 138C disposed parallel to the respective rows of contacts 135C. The screw shafts 138C are connected by gearing 140C to the shaft 139 so as to be operated in unison with the other screw shafts 138L and 138R. However, the threads of the shafts 138C have lead which is opposite to the lead of the threads of the other two screw shafts, and hence when the slide contacts 136L and 136R are being actuated in one direction in unison, the slide contacts 136C are actuated in unison in the other direction, and this adjustment is utilized as will hereinafter be described to govern and adjustably determine the flight level or height which will be maintained.

In providing energizing circuits for the motor 70C a wire 145 is extended from one terminal of a battery 78C to the center or common terminal of the motor 70C, and branch leads 146 and 147 from the other terminal of the battery to the slide contact 136L and one of the slide contacts 136C. A wire 148 is extended from the other contact 136C to one contact of a limit switch 149U and another wire 150 extends from the other contact of this switch to the other terminal of one winding of the motor 70C. When this motor circuit is closed the motor 70C is operated in such a direction that the elevators 26 are raised, and such circuit closure takes place when the mercury 129 reaches such a level in the central chamber 127 that the two active contacts 135C are electrically bridged thereby.

The other motor circuit is afforded by a wire 151 extended from the slide contact 136R to one contact of another limit switch 149D, and a wire 152 extends from the other contact of this switch to the other terminal of the other winding of the motor 70C. When this motor circuit is closed the motor 70C is operated in the other direction so as to lower the elevators 26 and thereby induce downward movement of the airplane. Such circuit closure takes place when the mercury rises sufficiently in the two side chambers 128L and 128R to engage and electrically bridge the two active contacts 135L and 135R. The two limit switches 149U and 149D are disposed on opposite sides of an extension of the arm 122 so the energized circuit will be opened when the elevators are moved in either direction to their extreme position.

Thus, with the foregoing arrangement, the pilot may, for any desired flight level and speed, adjust the contacts 136 so that all of the active contacts will be just above the level of the mercury in their respective chambers, it being recalled that for any particular speed and flight level the pressure on the detecting devices 57L4 and 57R4 will be substantially constant and will maintain the levels of the mercury in the various chambers at substantially the same level. For example, the pilot may choose a flight level and a flight speed which will maintain the mercury level in the two side chambers slightly above the mercury level in the central chamber, and in such an instance the handle 141 would be adjusted to establish a corresponding relationship between the several contacts 136. Assuming that the airplane is flying at the elevation and at the air speed for which the averaging device 125 is thus adjusted, it will be clear that upon an upward deviation from the desired level, the pressure at the two detecting devices 57L4 and 57R4 will be reduced so as to cause the mercury to rise in the side chambers 128L and 128R, thereby to close circuit through the contacts 136L and 136R. Such circuit closure causes the motor 70C to operate in such a direction that the elevators 26 are pivoted downwardly, thereby to induce downward movement of the airplane. Similarly, if the airplane pitches forwardly, the corresponding increase of pressure at the detecting devices 57L4 and 57R4 causes the mercury to be raised in the central chamber 127, thereby to close the other motor circuit through the contacts 136C so as to cause the elevators 26 to be raised and to induce upward climbing movement of the airplane.

It will be recognized, of course, that the pressure which is effective on the detecting devices 57L4 and 57R4 is a function not only of the speed and of the angle of attack of the airfoil sections, but also of the altitude of the airplane, and hence the adjustment of the averaging device 125 may be utilized to cause the airplane to change from one flight level to another. For example, if the pilot wishes to seek a higher flight level, the handle 141 is actuated to lower the central contacts 136C, thereby to close circuit to the motor 70C in such a manner as to raise the elevators 26. This induces a climbing attitude in the airplane, which in turn reduces the pressure at the detecting devices 57L4 and 57R4. Such pressure reduction serves to lower the mercury in the central chamber so as to break the motor circuit, and the elevators 26 come to a stop in a position which tends to produce a predetermined rate of climb. This climbing action of the airplane may progress until the reduction in atmospheric pressure compensates for the adjustment which has been made in the contacts of the averaging device 125, and in such an instance the airplane will return to a level flight attitude by virtue of the operation of the comparing device as hereinbefore described. However, the pilot may at any time reverse the adjustment of the contacts 136 so as to maintain the airplane on the flight level which it has then attained. In the event that the pilot wishes to descend to a lower flight level, the foregoing procedure is reversed, so that adjustment of the device 125 establishes a circuit through the contacts 136L and 136R.

Thus with this embodiment of the invention it will be evident that the elevator control means associated with the averaging device 125 serves to maintain the airplane at the desired flight level, and since the mercury in the central chamber 127 is subject to the average pressure of the two side chambers, the closure of circuit between the contacts 136C is independent of the lateral attitude of the plane. This same independence is also exhibited by the circuit which is controlled by the contacts 136L and 136R, for this circuit is not closed until the mercury in the respective side chambers has reached the level of both such contacts.

Hence it will be clear that the embodiment of the invention shown in Fig. 11 embodies novel aerodynamic control means which cooperates with gyroscopic or other direction determining control means in a novel manner such that improved overall operation of the airplane is attained.

In Fig. 12 of the drawings, another embodiment of the invention is illustrated whereby an airplane may be automatically controlled in substantially the same respects as in the embodiment of the invention shown in Fig. 11. However, in the embodiment shown in Fig. 12 the direction or course of the airplane is governed by the application of the initial automatic control to the ailerons rather than to the rudder, and the rudder is arranged to conform automatically to the aileron adjustment in the same manner as in the embodiment disclosed in Fig. 10. Thus, as schematically illustrated in Fig. 12, a propeller driven airplane similar to that hereinbefore described is automatically controlled as to its flight level by detecting devices 57L4 and 57R4 which act through an averaging device 125 and a power means 120 to control the elevators 26 in the manner described in connection with Fig. 11 of the drawings, and these elements are constructed and associated with each other and with the parts of the airplane in the manner described hereinbefore.

Similarly, the rudder 24 is automatically controlled by the detecting devices 57L3 and 57R3 which act through a comparing device 62A and a power means 100 to operate and control the rudder 24 in the manner hereinbefore described in connection with Fig. 10 of the drawings, and these elements are constructed and related to each other and to the elements of the airplane in substantially the same way as hereinbefore described in respect to Fig. 10 of the drawings.

To cooperate with such control means, the wings 16L and 16R are provided respectively with detecting devices 57L5 and 57R5 constructed and located in substantially the manner shown in Figs. 7 and 8, and these detecting devices are associated by tubes 88L5 and 88R5 with the chambers of a comparing device 62D which is constructed in substantially the same manner as the comparing device 62. The contacts 66L5 and 66R5 are arranged to afford circuits from a battery 78D to a motor 70D which constitutes the driving element of a power means 69D, and this power means is associated with the ailerons so as to actuate the same in the same manner as the power means 69 as shown in Fig. 10. In this embodiment of the invention the desired changes in the direction of flight of the airplane are initiated and governed by varying the balance of the pressures in the two chambers of the comparing device 62D, and such pressure variations are produced by pressure members 89R5 and 89L5 which are connected by tubes 160L and 160R to the tubes 88L5 and 88R5 respectively. The pressure members 89L5 and 89R5 have an adjustment bar 90D associated therewith for actuating the same, and a worm wheel 92D connected to the bar 90D may be rocked by actuation of a driving worm 93D. Thus, by rocking the bar 90D, the pressure balance or ratio between the two chambers of the comparing device 62D may be varied so as to cause actuation of the ailerons in one sense or the other, and this produces turning of the airplane in one direction or the other as described in connection with Figs. 9 and 10. As such turning is induced, the rudder 24 is automatically adjusted, as described in respect to Fig. 10 of the drawings, so as to conform with the aileron displacement and thereby assure a proper attitude of the airplane in the turn.

In the embodiment of the invention shown in Fig. 12, the course of the airplane is governed by automatic means which controls the adjustment of the pressure devices 89L5 and 89R5. In the present instance this automatic means is in the form of a gyroscope 162 having a control arm 163 which is settable to constitute an indication of the desired flight course. The arm 163 is disposed between a pair of normally open control switches 164R and 164L, and these switches are connected through a battery 78E to the two windings of a motor 70E so that by closure of one or the other of these switches the motor 70E may be caused to run selectively in one direction or the other. The motor 70E is connected by a worm and worm wheel drive 165 to the shaft of the worm 93D, so that the motor 70E may operate to adjust the pressure devices 89L5 and 89R5, thereby to control the operation of the ailerons of the airplane.

When the airplane deviates to the right from its set course as determined by the arm 163, the switch 164L is closed and the motor 70E is so operated as to rock the arm 90D in a clockwise direction, thereby to increase the pressure in the right hand side of the comparing device 62D. This closes the circuit to the left hand contact 66L5 to thereby operate the motor 70D in such a direction as to lower the right hand aileron 28R and raise the left hand aileron 28L. Such actuation of the ailerons initiates a slight turning movement of the airplane to the left. During such movement the rudder 24 automatically conforms with the aileron adjustment as described in connection with Fig. 10, and as the airplane returns to its course the other switch 164R is closed so as to bring the ailerons, and hence the rudder back toward positions which will result in continued flight of the airplane along the desired flight course.

With the embodiment of the invention shown in Fig. 12 it is to be observed that the aerodynamic aileron-control means is at all times responsive to momentary unbalance of the lifting forces such as may be caused by unsymmetrical gusts of wind, and under such conditions the differences in air pressure which are sensed by the detecting devices 57L5 and 57R5 are effective through the comparing device 62D to effect the required corrective adjustment of the ailerons as described in connection with Fig. 9.

It will be recognized, of course, that the pressure responsive detecting devices 57 might be varied as to form as well as location, so that Sylphon bellows or other pressure sensitive means might be employed in any of the various embodiments of the invention. Furthermore, it will be evident that the comparison of the sensed pressures as accomplished by the comparing devices as 62, and the averaging function as accomplished by the mercury switch means 125 may be attained by other types of pressure actuated means in the various combinations in which such devices are herein shown. The motor driven power means as 69 are also capable of variation for in some instances hydraulic or air operated means may be advantageously employed to accomplish the control functions herein disclosed.

From the foregoing description it will be evident that the present invention materially simplifies and improves the control of airplanes in flight, and that this is attained by means which are relatively simple and inexpensive in character. Moreover, it will be clear that the present invention enables the forces which might tend to produce undesired deviation of the airplane from its desired path to be detected before any undesired deviation has occurred, and the invention also enables corrective actuation of the aerodynamic controls to be effected in time to avoid such undesired deviation. It is also evident that the aerodynamic control means of this invention cooperates in a novel and simplified manner with automatic course-determining means such as a gyroscope, thereby to attain fully automatic control of the airplane in an improved and economical manner.

Hence, while I have illustrated and described preferred embodiments of my invention, it is to be understood that these are capable of variation and modification and I therefore do not wish to be limited to the precise details set forth, but desire to avail myself of such changes and alterations as fall within the purview of the following claims.

I claim:

1. In an airplane, a body having laterally projecting wings affording airfoil surfaces disposed substantially symmetrically with respect to the longitudinal axis of the airplane, ailerons, elevator means and steering means associated with said body and operable to control movement of the airplane about is rolling, pitching and yawing axes, respectively, means for adjusting said ailerons to initiate turning of the airplane, sensing means disposed in the upper surfaces of the respective wings and in the low pressure areas thereof and operable to sense variations in effective lift of said wings, and means governed jointly by the sensing means on the opposite sides of said axis and operable upon sensed inequality of the effective lift of the respective wings to operate said steering means to coordinate the position of the steering means with the adjustment of said ailerons.

2. In an airplane having a body affording oppositely extending wings and having elevators, aileron means and rudder means operatively associated therewith, power means for operating said elevators, air pressure responsive means disposed on the respective wings to measure the magnitude of the lifting forces acting thereon, independently operable power actuating means for said aileron means and said rudder means respectively, means governed by said air pressure responsibe means to control said independently operable power actuating means to actuate and control said aileron means and said rudder means to maintain said airplane in level flight substantially along a straight line path, independent adjusting means operable to vary the governing action of said air pressure responsive means on the actuating means of said rudder means and said aileron means, respectively, gyroscopic means mounted in said body, and power means governed by said gyroscopic means and operable to adjust one of said adjusting means to return the airplane to a selected course when deviation therefrom is detected by said gyroscopic means.

3. In an airplane, a body having laterally projecting wings affording airfoil surface disposed substantially symmetrically with respect to the longitudinal axis of the airplane, aileron means, elevator devices and steering means associated with said body and operable to control movement of the airplane about its rolling, pitching and yawing axes, respectively, a control element for actuating a first one of said means, sensing means on the respective wings operable to sense variations in air pressure acting on said wings, a first power mechanism governed jointly by said sensing means of the two wings and operable upon sensed inequality of air pressure acting on the respective wings to operate the other of said means to coordinate the same with the setting of said first means, gyroscopic mechanism, and other power mechanism controlled by said gyroscopic mechanism and operable to adjust said control element in accordance with the flight course indicated by said gyroscopic mechanism.

4. In an airplane, a body having laterally projecting wings affording airfoil surfaces disposed substantially symmetrically with respect to the longitudinal axis of the airplane, aileron means, elevator devices and steering means associated with said body and operable to control movement of the airplane about its rolling, pitching and yawing axes, respectively, a control element for actuating a first one of said means, sensing means on the respective wings operable to sense variations in air pressure acting on said wings, first power means governed jointly by said sensing means and operable upon sensed inequality of air pressure acting on the respective wings to operate the other of said means to coordinate the same with the setting of said first means as determined by said control element, gyroscopic means, and a further power means controlled by said gyroscopic means and operable to adjust said control element in accordance with the flight course indicated by said gyroscopic means.

5. In an airplane having a body affording oppositely extending wings and having elevator devices, aileron means and rudder means, aerodynamically controlled means operable automatically to actuate said aileron means and said rudder means to maintain the airplane in level flight along a predetermined and substantially straight line path, means for adjustably varying the governing action of said aerodynamically controlled means, gyroscopic means, and power means governed by said gyroscopic means and operable upon said adjusting means to maintain the airplane on a course established by said gyroscopic means.

6. In an airplane having a body with oppositely extending wings and having ailerons, rudder means and elevators, aerodynamically responsive sensing means for sensing the magnitude of the lift effective on the opposite wings, comparing means governed by said sensing means and operable to compare the sensed magnitude of the lift effective on the respective wings, means operable under control of said comparing means when the sensed lift of the respective wings varies from a selected ratio to adjust said ailerons to establish the selected ratio between the lift on the wings, power means operable on said comparing means for varying said selected ratio, gyroscopic means, means governed by said gyroscopic means and controlling said power means to vary said ratio, and automatically operable control means operable to actuate said rudder means in coordinated relation to the positioning of said ailerons to produce an efficient flight attitude of the airplane when the ailerons are adjusted under control of said comparing means.

7. In an airplane having a body with oppositely extending wings and having ailerons, rudder means and elevators, aerodynamically responsive sensing means for sensing the magnitude of the lift effective on the opposite wings, comparing means governed by said sensing means and operable to compare the sensed magnitude of the lift effective on the respective wings, means operable under control of said comparing means when the sensed lift of the respective wings varies from a selected ratio to adjust said ailerons to establish the selected ratio between the lift on the wings, power means operable on said comparing means for varying said selected ratio, settable direction control means, means governed by said direction control means and controlling said power means to vary said ratio, and automatically operable control means operable to actuate said rudder means in coordinated relation to the positioning of said ailerons to produce an efficient flight attitude of the airplane when the ailerons are adjusted under control of said comparing means.

8. In an airplane, a body affording oppositely extending wings and having aileron means, rudder means and elevator flaps, aerodynamically governed means operable to actuate said aileron means to maintain said airplane in substantially a predetermined flight attitude with respect to the rolling axis of the airplane, adjusting means operable upon said areodynamically governed means to adjustably vary said predetermined flight attitude, other aerodynamically governed means operable to actuate said rudder means in coordinated relation with respect to said aileron means to effect cooperation of said rudder means and said aileron means in governing the course and the flight attitude of said airplane about the yawing axis, adjusting means operable upon said other aerodynamically governed means to adjustably vary said coordinating action thereof, direction control means, and power means associated with said direction control means and operable upon one of said adjusting means under control of said direction control to govern the flight course of the airplane.

GEORGE W. CORNELIUS.

REFERENCES CITED

The following references are of record in the file of this patent:

UNITED STATES PATENTS

| Number | Name | Date |
|---|---|---|
| 2,020,105 | Constantin | Nov. 5, 1935 |
| 2,323,151 | Meredith | June 29, 1943 |
| 1,972,336 | Gardner | Sept. 4, 1934 |
| 1,874,662 | Veit | Aug. 30, 1932 |
| 1,351,538 | Reynolds | Aug. 31, 1920 |
| 2,325,108 | Carlson | July 27, 1943 |
| 2,270,875 | Hanson et al. | Jan. 27, 1942 |
| 2,283,754 | Matthews | May 19, 1942 |

FOREIGN PATENTS

| Number | Country | Date |
|---|---|---|
| 402,225 | Great Britain | Nov. 30, 1933 |